UNITED STATES PATENT OFFICE.

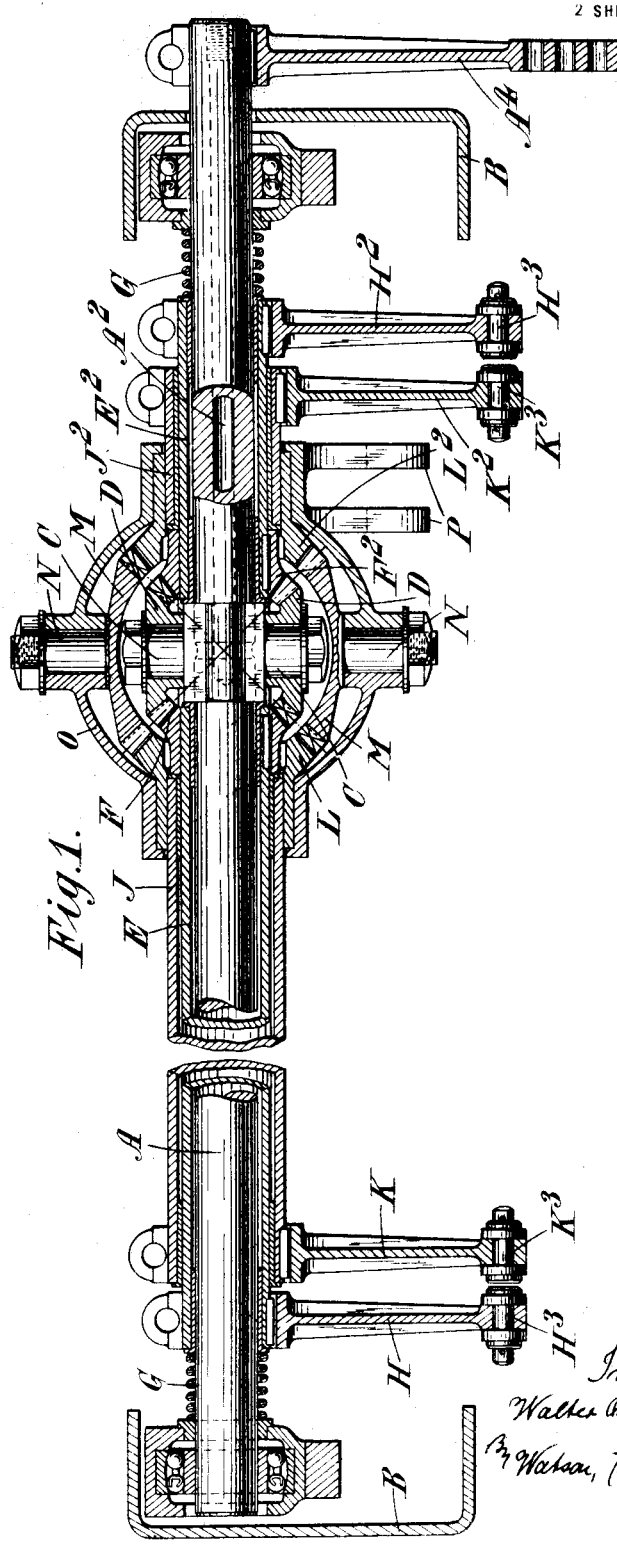

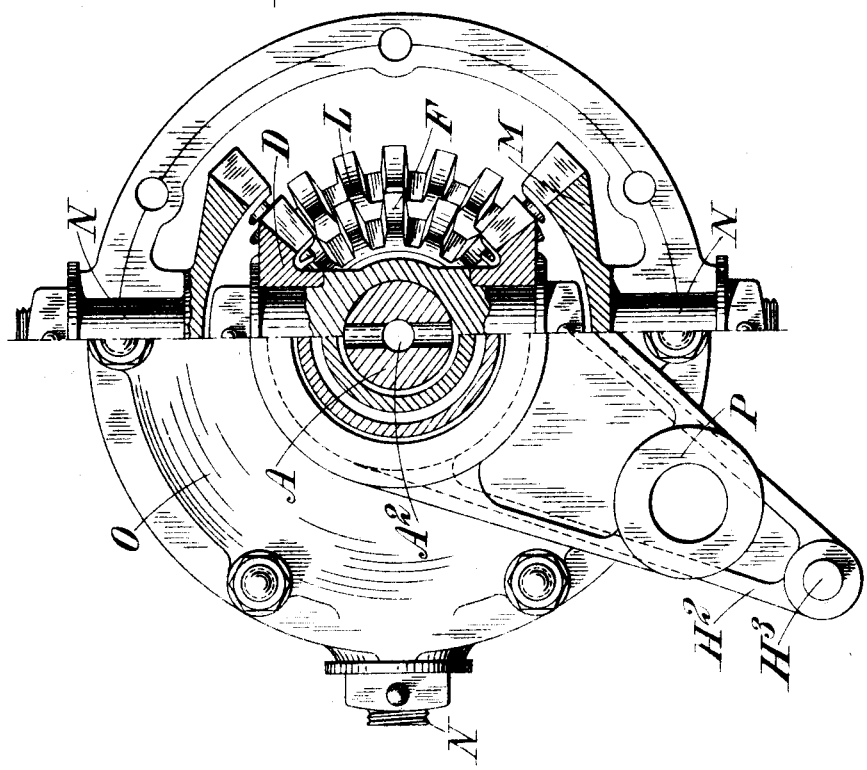

WALTER OWEN BENTLEY, OF LONDON, ENGLAND.

BRAKE-OPERATING MECHANISM.

1,368,879.  Specification of Letters Patent.  Patented Feb. 15, 1921.

Application filed May 29, 1920. Serial No. 385,333.

*To all whom it may concern:*

Be it known that I, WALTER OWEN BENTLEY, a subject of the King of England, residing at London, England, have invented certain new and useful Improvements in Brake-Operating Mechanism, of which the following is a specification.

This invention relates to brake operating mechanism for use on motor vehicles and the like, and it has for its object to provide a simple system, employing bevel planetary gearing, for compensating the pull applied to two pairs of brake rods. Hitherto this type of gearing has been suggested for use with a single brake, but by the present invention the compensating mechanism for a pair of foot-operated and a pair of hand-actuated brakes is combined. This involves the use of four brake rods, as there are four brakes concerned, one pair of rods being connected through one compensating device with the brake pedal and the other pair of rods being coupled to a second compensating device connected with a hand-operated lever.

According to this invention, the primary element of one system consists of a shaft carrying planet pinions engaging the sun pinions on a pair of sleeves to which are attached the levers to which one pair of rods is connected, and the primary element of the second system is a casing, or other member, carrying planet pinions also engaging sun pinions on sleeves provided with levers to which the second pair of rods is attached. The two primary elements are concentrically arranged and the primary element of the second system is preferably in the form of a casing inclosing both sets of gearing.

The two primary elements carry, or are coupled, to the brake pedal and hand lever.

In the accompanying drawings,

Figure 1 is a longitudinal section, and

Fig. 2 an end view, partly in cross-section, illustrating one method of carrying out this invention.

Like letters indicate like parts in both figures.

In this construction, a shaft A, constituting the primary element of one system, extends transversely across the frame B of a motor vehicle and carries the hand brake lever (not shown), or is provided with an arm $A^4$ coupled to the hand brake lever. At some suitable point this shaft is provided with radial arms, or a spider C upon which planet pinions D are mounted. At each side of the spider is a sleeve E, $E^2$, free to revolve on the shaft A and terminating in a bevel wheel F, $F^2$, engaging the planet pinions D. Each sleeve E and $E^2$ is prevented by thrust collars from moving endwise against the thrust of the bevels, and each is provided with an arm or lever H and $H^2$ coupled by means of a rod or the like to one brake band or the like (not shown).

Thus rotation of the shaft A transmits a compensated pull to each of a pair of bands or the like, as will be readily understood.

Free around the two sleeves E, $E^2$ are other sleeves J and $J^2$ each provided with an arm or lever K, $K^2$ coupled by rods or the like to the other two brake bands or the like in the usual way, and each of these sleeves is prevented from moving endwise. Each of these sleeves terminates in a sun bevel gear L and $L^2$ which engage planet bevels M on pins N projecting inward from a casing O. This casing takes a bearing upon the two outer sleeves J and $J^2$ and is free to rotate thereon. It is also provided with an arm P coupled to the brake pedal, or the like (not shown).

Operation of this pedal partially rotates the casing O, and, by means of the outer planetary gearing L and M, an equal pull is imparted to both brake rods attached to the arms K and $K^2$ carried by the sleeves J and $J^2$.

The casing O preferably contains lubricant serving to lubricate both sets of planetary gearing and the bearings of all the sleeves, and oil or grease may be fed to the casing along a passage $A^2$ in the shaft A.

By this means, the compensating mechanism for two independent sets of brakes is combined, and is arranged about a single axis, that of the shaft A. This is important as the rods to the brakes on the road wheels oscillate as the axle moves toward and away from the frame. This oscillation of the rods is liable to cause the brakes to be applied if the ends of the levers H, $H^2$ and K, $K^2$ are not correctly positioned. Generally there is only one correct point in the longitudinal plane of the vehicle for these levers and it is important therefore that the compensating gears be such that these lever ends can be brought into a line, which is effected by this invention. It will be seen that the ends $H^3$ and $K^3$ of all the four levers coupled to the brake rods lie on the same axis transverse to the frame.

All thrust is self-contained within the casing O and the whole mechanism can float endwise between the springs G. Further, the whole mechanism forms a single unit.

What I claim as my invention and desire to secure by Letters Patent of the United States is:—

1. In brake control, the combination with one planetary compensating system for a first pair of brakes of a second planetary compensating system for a second pair of brakes arranged co-axially with the first system, substantially as set forth.

2. A brake control as claimed in claim 1, in which the first planetary compensating system is concentrically arranged outside the second system, its primary element being a casing inclosing both systems, while the primary element of the second system is a shaft upon which both systems are carried, substantially as set forth.

3. A brake control, comprising a shaft adapted to be twisted to apply one pair of brakes, a planet pinion carrier on said shaft, planet pinions on said carrier, sun pinions engaging said planet pinions, a pair of inner sleeves around said shaft and carrying said sun pinions, a lever on each of said sleeves adapted to be connected to one pair of brakes, an outer pair of sleeves around said inner sleeves, a lever on each of said outer sleeves adapted to be connected to the other pair of brakes, outer sun pinions on said outer sleeves, outer planet pinions engaging said outer sun pinions, a casing carrying said outer planet pinions and adapted to be twisted, substantially as set forth.

In testimony whereof I have signed my name to this specification in the presence of two subscribing witnesses.

WALTER OWEN BENTLEY.

Witnesses:
A. J. EUSTACE,
I. W. LEAFE.